United States Patent [19]
Van Der Drift

[11] Patent Number: 5,538,378
[45] Date of Patent: Jul. 23, 1996

[54] SELF-LOCKING THREADED CONNECTING DEVICE

[76] Inventor: Richard W. Van Der Drift, 130 Magnolia Ave., Larkspur, Calif. 94939

[21] Appl. No.: 372,318

[22] Filed: Jan. 13, 1995

[51] Int. Cl.$^6$ .............. F16B 39/04; F16B 39/22
[52] U.S. Cl. .............. 411/299; 411/300; 411/951; 411/329
[58] Field of Search .............. 411/208, 296–303, 411/324, 950, 951, 329

[56] References Cited

U.S. PATENT DOCUMENTS

| | | | |
|---|---|---|---|
| 720,724 | 2/1903 | Minck | 411/299 |
| 1,289,867 | 12/1918 | Moore | 411/951 X |
| 1,593,088 | 7/1926 | Lowe | 411/951 X |
| 1,809,620 | 6/1931 | Cole | 411/303 |
| 2,372,884 | 4/1945 | Davis | 411/300 |
| 2,534,035 | 12/1950 | Lachatre | 411/299 |
| 4,168,731 | 9/1979 | Taber | 411/951 X |

FOREIGN PATENT DOCUMENTS 2622214  7/1977  Germany .............. 411/300

*Primary Examiner*—Neill R. Wilson
*Attorney, Agent, or Firm*—Fay, Sharpe, Beall, Fagan, Minnich & McKee

[57] ABSTRACT

A self-locking threaded connecting device comprising a male component (11) with a recess locking thread type (31) and a female component (12) with a flexible thread segment (21). Tension from the alignment of the internal flexible thread segment urges projections (22) of the flexible thread segment into the recesses (32) of the recess locking thread and thereby prevent the threaded fastener from loosening and coming apart in response to axial pressure optionally combined with vibration, expansion, contraction or other movement. The projections and recesses are shaped so that the faces glide by each other and unlock with the application of adequate torque. The two threads are designed to work together. The female component when used with a standard male component without recesses provides resistance to inadvertent loosening.

14 Claims, 4 Drawing Sheets

SELF-LOCKING THREADED CONNECTING DEVICE

BACKGROUND OF THE INVENTION

1. Field of the Invention

The present invention relates to self-locking threads and threaded connections, and more particularly to self-locking threaded connection devices that may be discrete fasteners intended to secure two or more work pieces together and comprised of a combination of a threaded bolt, cylinder, stud, shank or screw mated with a complimentary threaded nut or hole, or that also may be an integral part of some other device, such as the threads on the end of the arm that screws into the threaded complimentary hole in the torso of a toy soldier.

2. Description of the Related Art

Locking threaded fasteners and threaded connecting devices of a wide variety of types are available which reduce the tendency of male, generally cylindrical, threaded components from altering their position in relation to their corresponding female threaded component, thereby reducing the tendency of such threaded fasteners and threaded connecting devices to loosen and come apart in response to vibration, expansion, contraction and other movement. Many such fasteners function in this regard by increasing friction between the otherwise mated threads of the male and female components or between the fastener and the parts joined by the fastener. Examples include: lock washers, tooth washers, blind thread bores filled with resilient inserts such as disclosed in U.S. Pat. No. 5,078,562 issued to DeHaitre on Jan. 7, 1992, and screw thread profiles that jam or deform when tightened such as disclosed in U.S. Pat. No. 5,242,252 issued to Harle on Sep. 7, 1993. Other such fasteners and connections function by increasing the friction between the engaging surfaces of the head of the male component and work piece, or between the female component and work piece such as disclosed in U.S. Pat. No. 4,290,469 issued to Nakae on Sep. 22, 1981. In all such arrangements, the increased friction makes rotation more difficult between the male and female components, thereby preventing inadvertent release or loosening of the male and female components. A drawback of all these approaches is that the male and female components can loosen at any axial pressure or tension less than that required to strip the male component out of the female component. Since the threads in each case fall away in the direction of axial pressure or tension, a portion of such pressure or tension is translated into a rotational force tending to loosen the components. Also, fasteners using these approaches generally require high or increased torque to install, or mar the joint surface, or are not reusable, or require greater loads to be effective than is desirable to apply to some joints. Self-locking accessories such as cotter pins, lock wires, and nut assemblies comprising a first working nut and a second locking nut part as disclosed in U.S. Pat. No. 5,154,560 issued to Copito on Oct. 13, 1992, have the drawback of requiring additional installation effort.

Therefore, there is a need for threads, threaded fasteners, and threaded devices: (i) that will not come loose under loads equal or less than the fastener supports, (ii) that can be easily installed using conventional tools, (iii) that employ torque values appreciably closer to those torque values only necessary to clamp together the workpieces (as opposed to requiring higher torque values to provide increased resistance against loosening), and (iv) that can be installed as easily as standard fasteners. The present invention addresses these drawbacks in known prior threaded fasteners and threaded devices and meets these needs with a novel thread design which can be forged, rolled, stamped, or otherwise applied to threaded fasteners and threaded devices using conventional techniques. Improved threaded fasteners and threaded devices may therefore be manufactured at close to the cost of traditional locking threaded fasteners and devices.

Reference Numerals in the Drawings

11—male component
12—female component
21—female component's flexible thread segment
22—projections of the flexible thread segment
25—voids in flexible thread segment
26—positioning tabs of the flexible thread segment
31—recess locking thread
32—recesses of the recess locking thread

DETAILED DESCRIPTION OF THE PREFERRED EMBODIMENT

Figure 1A:
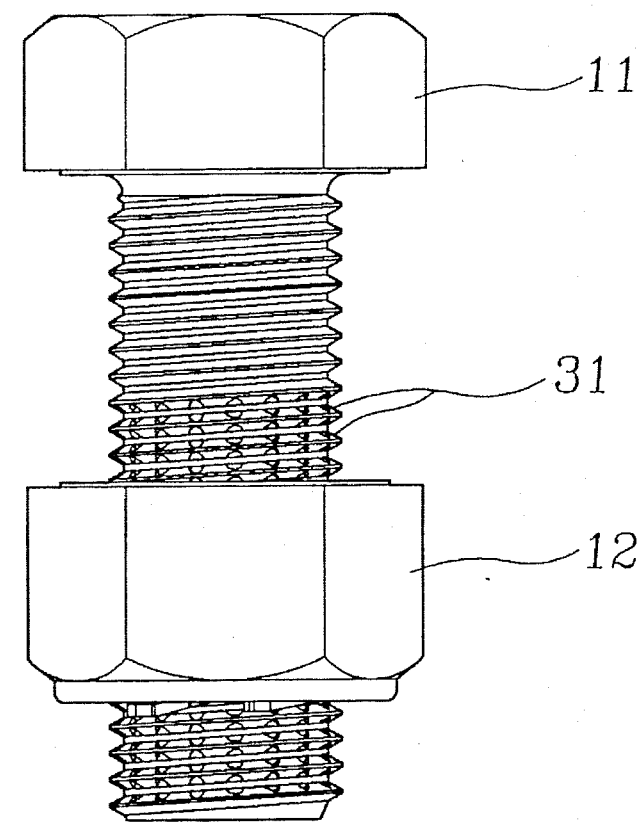
FIG. 1A is a side view of the invention in an assembled state.
Figure 2A:
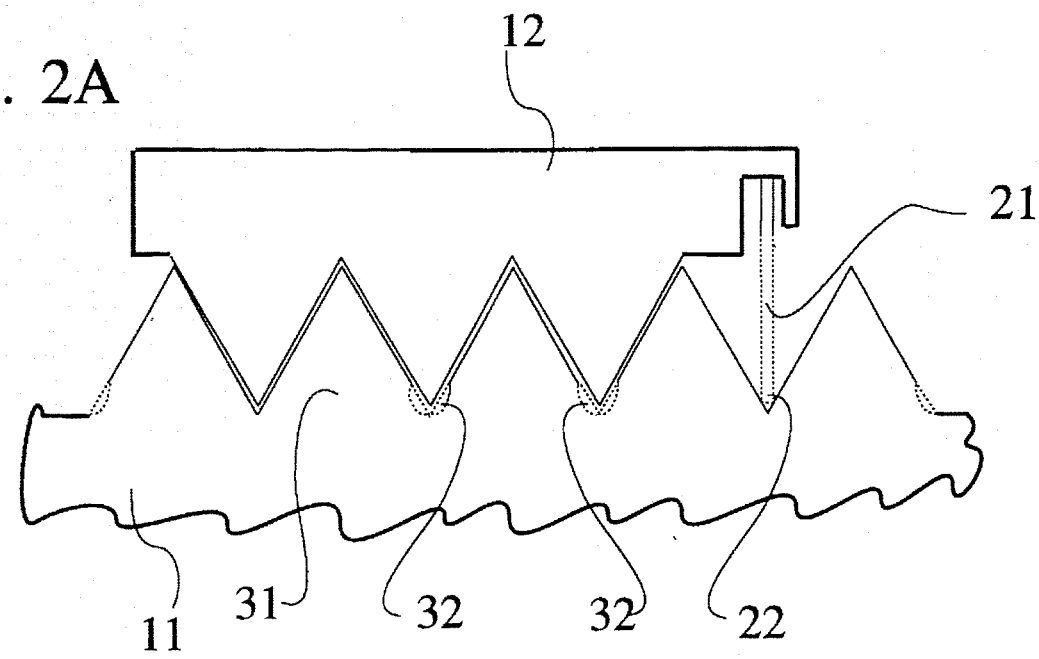
FIG. 2A is a side view of adjacent thread rotations of the invention in an assembled state and showing one flexible thread projection in an unlocked state as applied to male and female fastening components.

FIG. 1A shows a side view of a self-locking threaded connection, in an assembled state, comprising a male component (11) having a first novelly formed thread (31) (hereafter referred to as the "recess locking thread") and a female component (12) having applied to it a second novelly formed thread (31) (hereafter referred to as the "projection locking thread," more fully shown in FIG. 2A). The projection locking thread is aligned on the female component so that its flexible projections (22) press up against the thread of the male component. The projection locking thread is either attached to the female component in a manner that enables its projections to flex axially or radially, or the projections are formed in a manner that enables them to flex axially or radially. The female component is typically a threaded nut, bore, or hole. The male component is typically a threaded bolt, cylinder, stud, shank or screw. The projection locking thread and the recess locking thread are designed to work together so that, as the male component is being screwed into or out of the female component, the two threads engage each other in a novel manner (hereafter referred to as "meshing") and thereby lock. In the drawings, dashed lines indicate that a feature appears only intermittently from the given perspective.

Figure 1B:
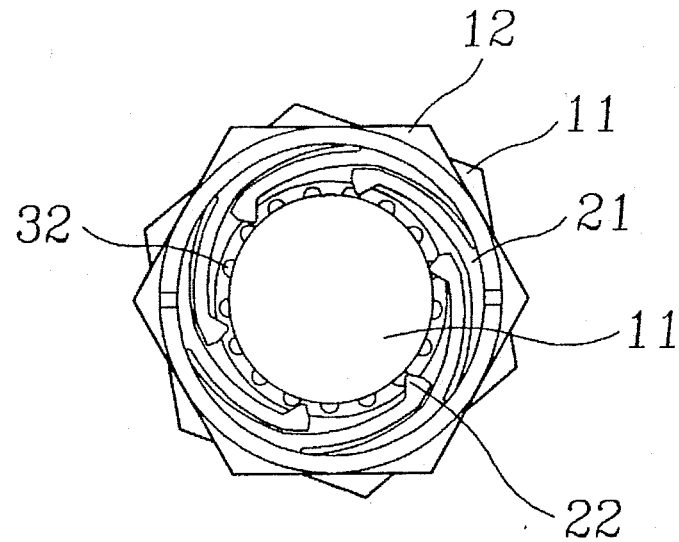
FIG. 1B is a bottom view of the invention in an assembled state showing the flexible thread projections of the female component interacting with the thread recesses of the male component.

FIG. 1B shows an end view of the self-locking threaded connection of FIG. 1A in a meshed state. Meshing occurs when any of the projections (22) of the flexible thread segment (21) align with any of the recesses (32) of the recess locking thread (31). When such alignment occurs, the tension pressing the female's internal flexible thread segment's projections up against the male's thread (21) forces the aligned projection into the corresponding aligned recess thereby meshing the threads. Once meshed, sufficient additional higher torque in either the loosening or tightening direction unmeshes the threads. The sides of the projections and recesses have a gentle enough slope so that torque can urge the projections to slide up and out of the recesses, and thereby unmesh the threads. When the torque is sufficient to overcome the friction between the faces of the engaged projections and recesses and to overcome the tension pressing the female's internal flexible thread segment up against the recess locking thread (in addition to overcoming friction between the female's standard thread and the male's thread as with standard thread configurations), the threads unmesh and the fastener is in an unlocked state until a projection and a recess again align and mesh. In FIGS. 1A and 1B, the flexible thread segment (21) flexes perpendicularly to the axis of the fastener.

Figure 2B:
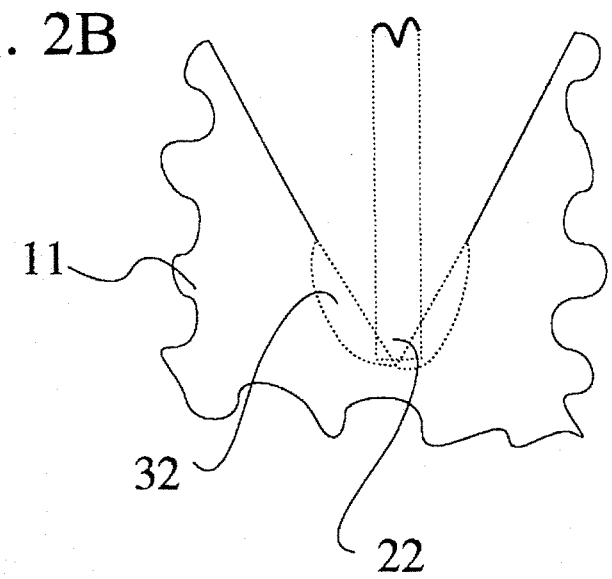
FIG. 2B is a side view of adjacent rotations of the invention in an assembled state increased in size to show details of one flexible thread projection of the female component meshed with a recess of the male component.

FIGS. 2A is a side view of one projection of the flexible thread segment in an unlocked state. In FIG. 2B, the projection appearing in FIG. 2A is shown in greater detail and is meshed with a recess of the recess locking thread In the drawings, dashed lines indicate that a feature appears only intermittently from a given perspective.

Traditional threaded fasteners subjected to dynamic loads, stress reversals or vibration are susceptible to loosening. Tightening such fasteners develops axial tensile stress that creates frictional resistance to loosening between mated threads and between bolt and nut surfaces bearing against the joined materials. This same tensile stress in the bolt also encourages the mating threads to slip due to the "downward" slope of their helix angle. In the current invention, for the mating threads to slip even as vibration reduces resistance, the axial tensile stress must also lift or force the flexible thread segment's projections out of the male thread's recesses and to overcome any remaining friction. To push or lift a projection out of a recess, the loosening torque resulting from tensile stress must be great enough to overcome the natural spring return action pushing the flexible thread segment's projections into the male thread's projections. To ensure that the loosening torque is less than these resistive forces, the combination of the flexible thread segment's projection tension, the slope of the sides of the recesses, and the shape of the projections are in combination engineered to create sufficient resistance to prevent inadvertently loosening of the fastener.

In alternative embodiments, the faces of the recesses and projections can be formed so that the projections dig into the recesses when torque is applied in either the tightening or loosening directions. In such embodiments, the fasteners cannot be either further tightened or loosened once meshing occurs without damaging the projection or the recess. When the female component is used with a traditional bolt or other male component without recesses, the flexible thread segment presses up against the males thread creating additional resistance to loosening. When the flexible thread is engineered to press with sufficient force against the thread of the male, the additional resistance prevents inadvertent loosening in the same manner as prevailing torque nuts such as those with nylon inserts.

Figure 3A:
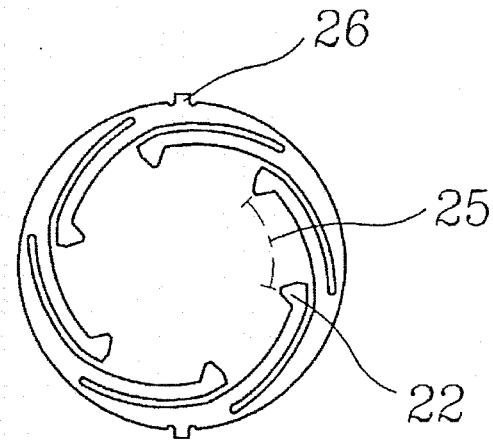
FIG. 3A is a top view of the female fastening component's flexible thread according to a preferred embodiment of the present invention.
Figure 3B:
FIG. 3B is a side view of the female fastening component's flexible thread according to a preferred embodiment of the present invention.
Figure 3C:
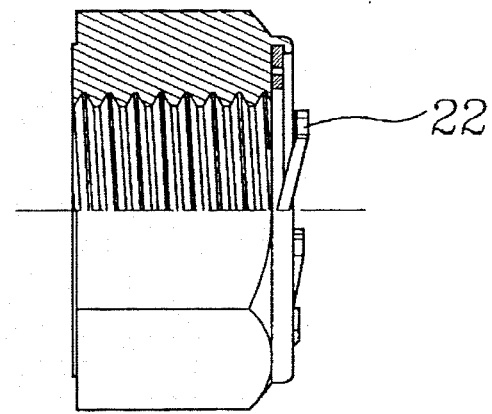
FIG. 3C is a bottom view of the female fastening component with its flexible thread according to a preferred embodiment of the present invention.
Figure 3D:
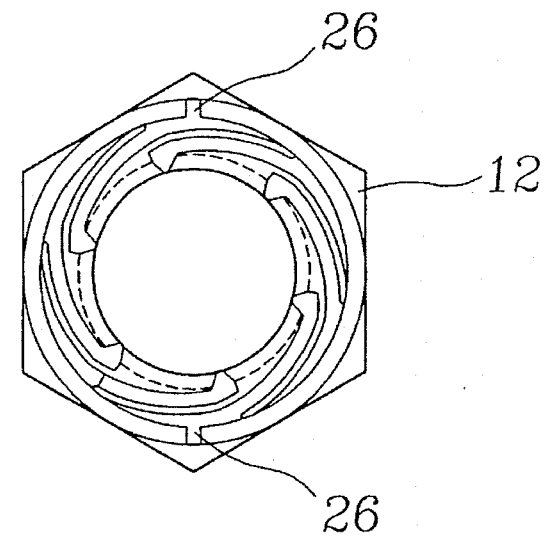
FIG. 3D is a half cut away side view of the female fastening component with its flexible thread according to a preferred embodiment of the present invention.

FIG. 3A is a bottom view and FIG. 3B is a side view of the female component's flexible thread segment (21 of FIG. 1B). In the preferred embodiment, the female's flexible thread segment is not solid from its root to its crest for its full length. A series of voids in the flexible thread segment (25), formed extending from the thread crest toward the thread root, facilitate each projection (22) independently meshing fully with any recess (32 in FIG. 1B) when they align irrespective of the meshing state and position of the other projections and recesses. In the preferred embodiment, the individual projections align radially with the recesses, but the projections as a whole do not need to be arranged symmetrically with the recesses. In the preferred embodiment there are a prime number of recesses on each thread rotation, seventeen, and six projections on the flexible thread segment. The flexible thread segment can be attached to the female component (12) in any manner so long as the flexible thread segment always rotates with the female component and cannot rotate independently of the female component. In the preferred, embodiment positioning tabs (26 of FIG. 3A and 3C) prevent the flexible thread segment from rotating in relation to the rest of the female component (12) and position the flexible thread segment so that it's projections continue in the helix path formed by the standard thread of the thread of the female component.

Figure 4A:
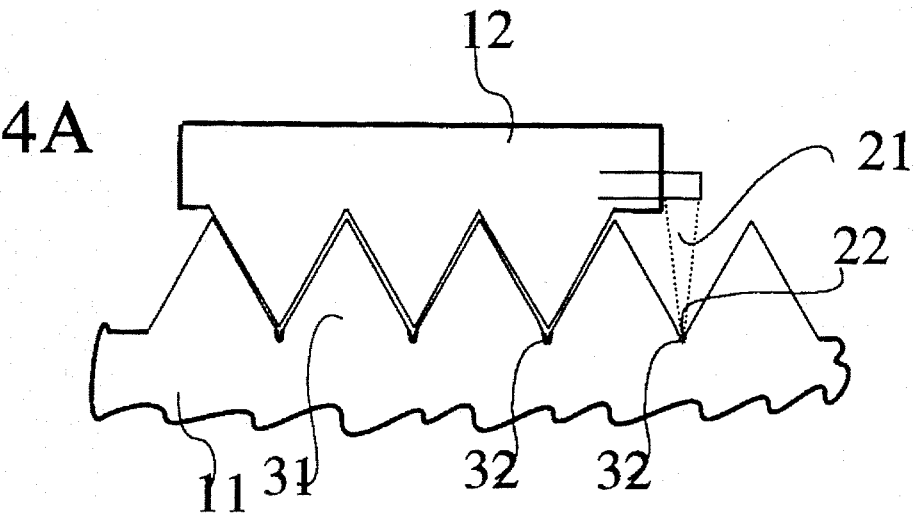
FIG. 4A is a side view of adjacent rotations of an alternative embodiment of the invention in an assembled and unlocked state, where the recesses are located at the root of the recess locking thread, and extending into the core of the male fastening component between adjacent thread rotations of the male component, and the projections are located on the crest of the internal flexible thread segment.

FIG. 4A is a side view of adjacent rotations of an alternative embodiment of the invention in an assembled and unlocked state. The recesses (32) are located at the root and extend into the male component's (11) core between adjacent thread rotations of the recess locking thread (31).

Figure 4B:
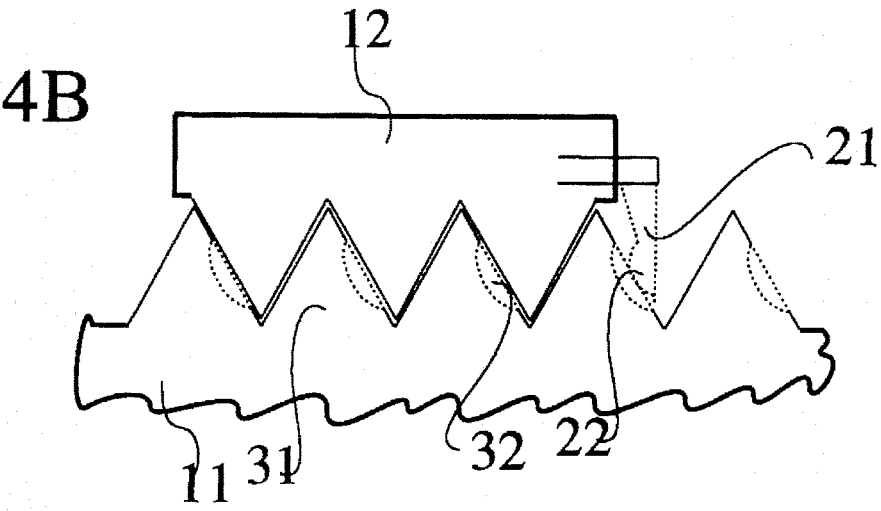
FIG. 4B is a side view of adjacent rotations of an alternative embodiment of the present invention in an assembled and unlocked state as applied to male and female fastening components where the projections of the flexible thread segment press axially against the recesses of the male thread.

FIG. 4B is a side view of adjacent rotations of an alternative embodiment of the present invention in an assembled and unlocked state where the projections of the internal flexible thread segment press axially against the recesses of the male thread. In the embodiment shown, the recesses (32) and the projections are on the following flanks. In alternative embodiments they can be on the leading flanks.

While the present invention has been described with reference to certain preferred embodiments, those skilled in the art will recognize that various modifications may be provided. For example, there are many other embodiments having a variety of configurations for the shape, angle and size of the projections and recesses. The recesses can be located in the center of the thread flank instead of at or near the root. Instead of recesses on the external thread, projections on the external thread can be used to mesh with the projections of the flexible thread segment. The flexible thread segment can be more or less than one full rotation. These and other variations upon, and modifications to, the preferred embodiment are provided for by the present invention which is only limited by the following claims.

I claim:

1. A threaded fastening device comprising:
   a. a generally cylindrical first body having a longitudinal axis and an external helical thread having a root,
   b. a second body having an internal helical thread, a segment of the internal thread defined by at least one projection carried by a resilient arm mounted in the second body with the projection extending radially toward the axis of the first body when assembled such that when the first body and the second body are screwed together, the projection is urged radially toward the external thread,
   c. the external thread having a continuous root and a series of at least one means for meshing with the projection when the means for meshing and the projection axially and radially align, said at least one means for meshing each being confined between axially adjacent thread rotations of the external thread and contoured to permit the projection to move therepast in either direction of rotation without damage to either the at least one means for meshing or the projection.

2. The threaded fastening device of claim 1 wherein the means for meshing is a series of at least one projection between thread rotations.

3. A threaded fastening device as set forth in claim 1 wherein the at least one means for meshing comprises individual recesses formed in the root of the external thread, each individual recess being confined to a location between axially adjacent thread rotations without opening axially through an individual thread location.

4. A threaded fastener device as set forth in claim 1 wherein the said at least one projection is urged both radially and axially relative to the external thread.

5. A threaded fastening device as set forth in claim 1 wherein each said resilient arm extends in a direction generally parallel to the external thread.

6. A threaded fastening device as set forth in claim 5 wherein there are a plurality of said resilient arms each carrying a separate one of said at least one projection.

7. A threaded fastening device as set forth in claim 7 wherein said resilient arms all extend in the same direction.

8. A threaded fastening device as set forth in claim 7 wherein each said projection is located at an outer end of a resilient arm.

9. A threaded fastening device comprising:
   a. a generally cylindrical first body having an external thread,
   b. a second body having an internal thread, a segment of the internal thread having at least one projection with spring return action and extending toward the axis of the first body when assembled such that when the first body and second body are screwed together, the projections are urged both radially toward the external thread's root and axially toward the external thread's flank by the spring return action,
   c. the external thread having a series of at least one means for meshing with the internal thread's projections when the means and projections axially and radially align and wherein the means for meshing are on the flank and root of the external thread.

10. A threaded fastening device as set forth in claim 9 wherein the at least one means for meshing comprises individual recesses formed in the root of the external thread, each individual recess being confined to a location between axially adjacent thread rotations without opening axially through an individual thread rotation.

11. A threaded fastening device as set forth in claim 9 wherein the projections are carried on resilient arms extending in a direction generally parallel to the external thread.

12. A threaded fastening device as set forth in claim 11 wherein each of said resilient arms carries a separate one of said at least one projection.

13. A threaded fastening device as set forth in claim 12 wherein said resilient arms all extend in the same direction.

14. A threaded fastening device as set forth in claim 9 wherein the means for meshing include recesses formed between adjacent thread rotations with each recess having a portion in the root and flank of the thread.

* * * * *